United States Patent [19]

Cucchi

[11] Patent Number: 5,366,334

[45] Date of Patent: Nov. 22, 1994

[54] LOADING DEVICE FOR SEQUENTIAL LOADING OF BARS IN MACHINE TOOLS

[75] Inventor: Pietro Cucchi, Bussero, Italy

[73] Assignee: Pietro Cucchi S.p.A., Italy

[21] Appl. No.: 118,102

[22] Filed: Sep. 7, 1993

[30] Foreign Application Priority Data

Sep. 9, 1972 [IT] Italy .................... MI92A002087

[51] Int. Cl.⁵ .................................... B23B 13/00
[52] U.S. Cl. ............................ 414/15; 82/126; 82/127
[58] Field of Search ........... 414/15, 18, 745.9, 746.4; 82/126, 127

[56] References Cited

U.S. PATENT DOCUMENTS

| | | | |
|---|---|---|---|
| 3,924,494 | 12/1975 | Azuma | 414/15 X |
| 4,292,788 | 10/1981 | King | 414/745.9 X |
| 4,417,491 | 11/1983 | Uehara et al. | 414/18 X |

FOREIGN PATENT DOCUMENTS 2-53501  2/1990  Japan ...................... 82/126

*Primary Examiner*—Michael S. Huppert
*Assistant Examiner*—Janice L. Krizek
*Attorney, Agent, or Firm*—Shlesinger, Fitzsimmons & Shlesinger

[57] ABSTRACT

A loading device for sequential loading of bars in machine tools comprises chutes (16) for arrival of a bar against stops (17) for stopping in a withdrawal position. Beyond the stops (17) there is a guide (20,20') for axial sliding of a bar in a direction aligned with the inlet of a machine tool (14). Raising elements (22) have their upper surface (23) inclined and terminating with a stop part (24) arranged substantially vertically to the guide (20,20'). Said raising elements (22) are mobile between a first position below the chutes (16) and the guides (20,20') and a second position above the stops (17) and the guides (20,20') in which they raise the bar placed in the withdrawal position to cause sliding onto the upper inclined surface (23) toward the guide (20,20') to a stop position (26). Upon return of the raising elements to the first position the bar in the stop position (26) is placed on the underlying guides (20,20') to be pushed by (pushers) (37,38) into the machine tool.

12 Claims, 3 Drawing Sheets

LOADING DEVICE FOR SEQUENTIAL LOADING OF BARS IN MACHINE TOOLS

BACKGROUND OF THE INVENTION

The present invention relates to a loading device for sequential feeding of bars into a lathe, e.g. the numerical control type.

In the field of automatic lathes the problem of sequentially feeding the bars to be machined is well known. Indeed, it is usually necessary to respect relatively short loading and unloading times while at the same time avoiding bar positioning errors and jamming of the machine. This is particularly problematical when the bars to be supplied are relatively heavy because of the inertia of the settling movements that the bars make. For example, in known loaders the bars are often made to run on a moving inclined plane at the end of which is an axial sliding guide for the bar toward the machine tool. The bar running on the inclined plane thus falls into the guide. Especially in the case of relatively heavy bars the lateral velocity of the bar in falling on the guide is such as to make likely jumping over the guide and consequently jamming of the loader. It is also likely that a relatively heavy bar in falling into the guide would cause vibrations and shocks which could damage the structure.

SUMMARY OF THE INVENTION

The general purpose of the present invention is to supply a loader for machine tools such as lathes which would feed with high speed and accuracy even heavy bars while avoiding possible jamming situations.

In view of said purpose it was sought to provide in accordance with the present invention a loading device for loading of bars into a machine tool comprising in combination:

inclined plane chutes for arrival of a bar against stops in a withdrawal position, an axial sliding guide for a bar with said guide being arranged beyond said stops and aligned with an axial insertion position for a bar in the machine tool, raising elements arranged substantially between the withdrawal position and the guide and having the upper surface inclined downward in the direction of said guide and terminating with a raised stop part arranged substantially vertically to the guide and the raising elements being mobile between a first nonoperating position below the chutes and the guides and a second operating position above the stops and the guides in which the raising elements raise the bar placed in the withdrawal position up to a height greater than the stops to cause sliding on the upper inclined surface toward the guide to a stop position against the stop and upon return of the raising elements into the nonoperating position the bar slides into the stop position being placed on the underlying guides, pushing and gripping means moving coaxially to the guide to move axially the bar placed on them along the guide to introduce the bar into the machine tool add subsequently withdraw at least a remnant thereof from the machine tool along the guide, and disengagement means for the bar remnant from the pushing meads for its falling to an unloading position.

BRIEF DESCRIPTION OF THE DRAWINGS

To clarify the explanation of the innovative principles of the present invention and its advantages compared with the known art there is described below with the aid of the annexed drawings a possible embodiment by way of nonlimiting example applying said principles. In the drawings.

DETAILED DESCRIPTION OF THE INVENTION

Figure 1:
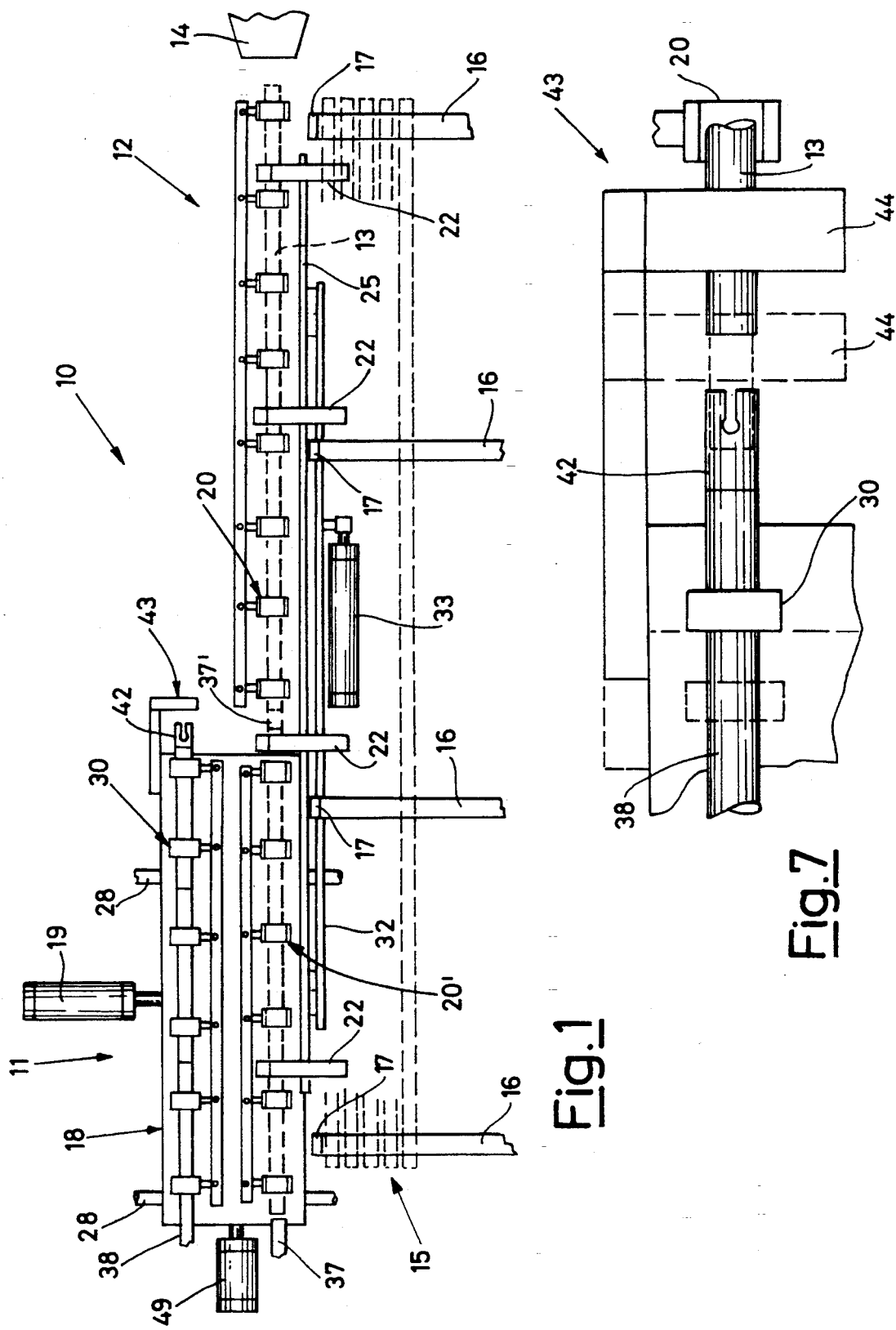
FIG. 1 shows a schematic plan view of a feeding and unloading device in accordance with the present invention.

With reference to the figures FIG. 1 shows schematically a loading device indicated generically by reference number 10 comprising a first part 11 and a second part 12 of a guide for a bar 13 to be fed by axial insertion into a machine tool, e.g. a spindle 14 belonging to a lathe of the known art and therefore not further illustrated. Laterally and parallel to the first and second parts 11, 12 is placed a chute 16 made up e.g. of several parallel cross pieces 16 for supply of bars 15 (shown in broken lines in FIG. 1) to be taken sequentially. As seen also in FIGS. 2 and 4, at the end of the inclined plane are placed stops 17 against which butts the first bar of the sequence 15 supplied on the chute.

As seen in FIG. 1 the first and second parts of the guide comprise a guide made up of an aligned sequence of guide supports in the shape of the letter U 20′, 20 respectively.

Said supports can be e.g. supported by arms 21 appropriately anchored in a slightly elastic manner for absorption of vibrations during operation of the machine.

Figure 2:
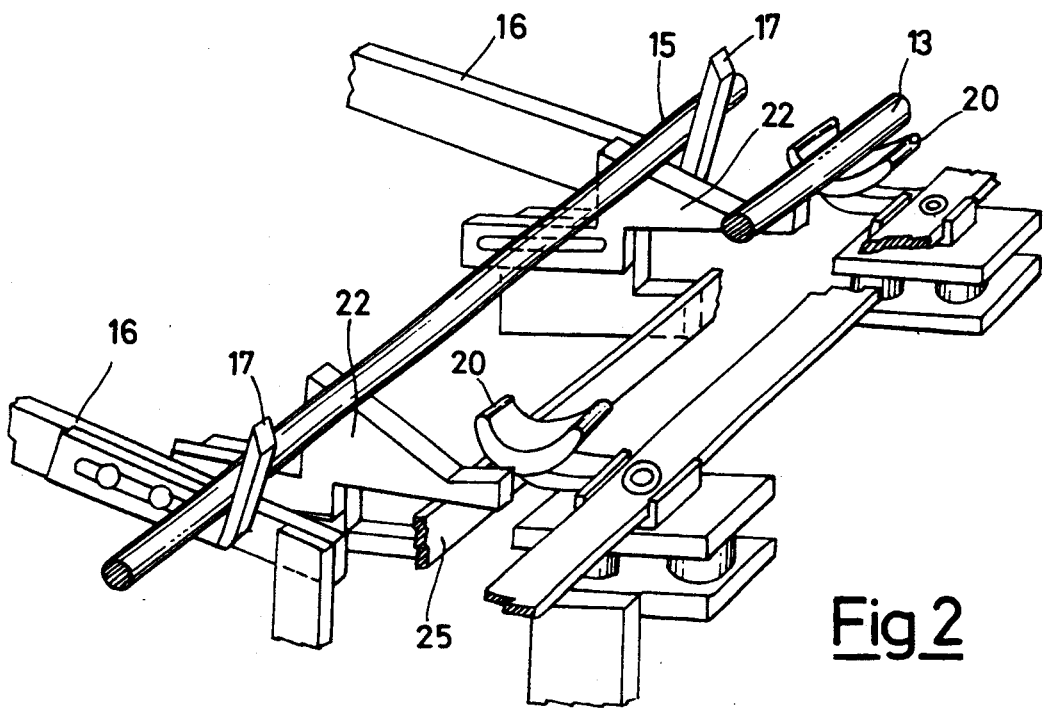
FIGS. 2 and 3 show perspective, schematic and partial views of a first and second part respectively of the device of FIG. 1.

As seen better in FIG. 2, aligned below between the first bar to be withdrawn butted against the stops 17 and the guide 20, 20′ are arranged raising elements consisting of raising or withdrawal blades 22. As is clear also from FIG. 4, the blades 22 have the upper surface formed generally like the letter V with a first part 23 inclined downward away from the stops 17 and terminating with a second part or stop rise 24, e.g. consisting of a surface oppositely inclined upward after passing a stop point 26 vertically beneath the guides. The two surfaces 23, 24 identify a V-shaped seat for reception of a bar as described below.

Figure 4:
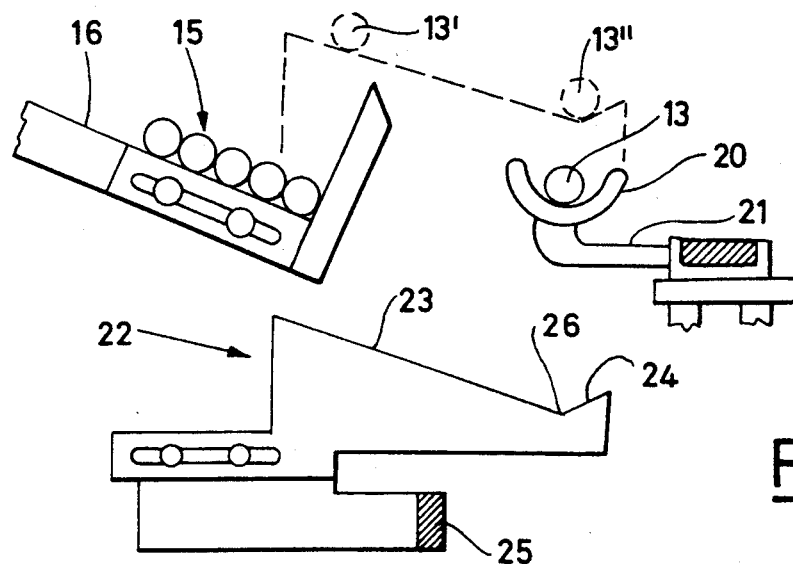
FIG. 4 shows a schematic and partial view of a cross section of the device of FIG. 1.

The blades 22 are supported by means of a vertical movement to move simultaneously on command between first lower nonoperating positions shown in solid lines in FIG. 4 and upper operating or withdrawal positions shown in broken lines in the same Figure.

In this manner, when the blades move to the operating position they raise the first bar arranged against the stops 17 until they cause it to jump over the stops. The bar indicated by reference number 13′ in FIG. 4 slides on the plane 23 until it is received at the stop point 26 (bar 13″ in FIG. 4 ). The stop rise 24 inclined upward blocks the movement of the bar which is positioned accurately thanks to the advantageous V shape given by the meeting of the inclined planes 23 and 24. At this point the blades 22 are again lowered into the nonoperating position and the transferred bar is thus rested in the guides 20, 20' (bar 13 in FIG. 4) Transfer of the bar between the chute 16 to which the bars can be fed manually or by an automatic magazine and the axial insertion guide in the machine is in this manner fast and safe, the bar being accurately stopped vertically to the guide before being deposited with a simple vertical movement.

Figure 3:
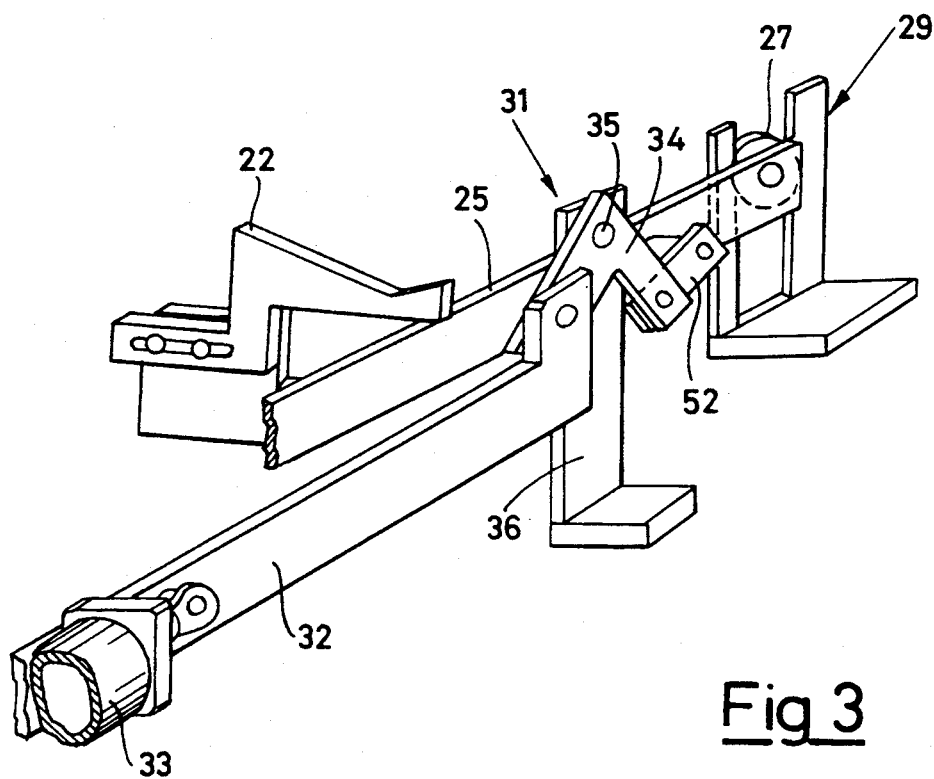

FIG. 3 shows schematically add partially a possible embodiment of a vertical movement mechanism for the blades. As seen in said Figure the blades 22 are all supported by a beam 25 longitudinal to the machine 10 and moving vertically thanks to carriages or roller 27 placed at its two ends and sliding along vertical guides 29. The beam 25 is connected through two crank mechanisms 31 to the ends of a control rod 32 which translates horizontally by means of a piston operated linear actuator 33. FIG. 3 shows a single end of the beam and single crank mechanism.

The other end and the other crank mechanism are equivalent. As seen in the figures the crank mechanism consists of a bell crank 34 pivoted centrally at 35 to a fixed support 36. One end of the bell crank 34 is pivoted to the control rod 32 while the other end is pivoted to a tierod 52 which is in turn pivoted to the beam 25, in this manner it is clear that when the actuator 33 moves the rod 32 horizontally the crank mechanisms push the beam 25 to slide with its ends along the guides 29 causing said vertical movement of the plurality of blades.

When a bar 13 is housed in the guides 20, 20' aligned with the loading input of the machine tool a pushing unit pushes axially the bar to introduce it in the machine and then withdraw from the machine the residual bar length of the machining.

To limit the length of the device the solution described below has been found advantageous.

The guide supports 20 belonging to the guide part 12 closer to the machine to be fed are stably aligned with the bar inlet in the machine tool 14. The guide part 11 comprises a carriage 18 on which is supported the first row 20' of supports in the shape of the letter U and a second row 30 of supports parallel to the first. The carriage 18 is mobile transversely to the extension of the guides to bring into alignment with the fixed guide 12 alternately the guide supports 20' or 30 of the part 11. The transverse movement of the carriage 18 can be e.g. obtained by its running along tracks 28 by means of a compressed air piston 19.

As seen again in FIG. 1, aligned with the guides 20' and 30 are placed two pushers 37, 38 mobile axially to the respective guides to slide in the channel formed thereby. The pusher 37 is mobile with its free end between a retracted position or rear stop shown in solid lines in the figures and a front stop position beyond the guides 20' shown in broken lines and indicated generally by reference number 37'. The pusher 38 is mobile with its free end between a retracted or rear stop position in which as seen again in FIG. 1 it is received with its free end just beyond the guides 30 and a front stop position in which its free end is near the machine 14.

Figure 6:
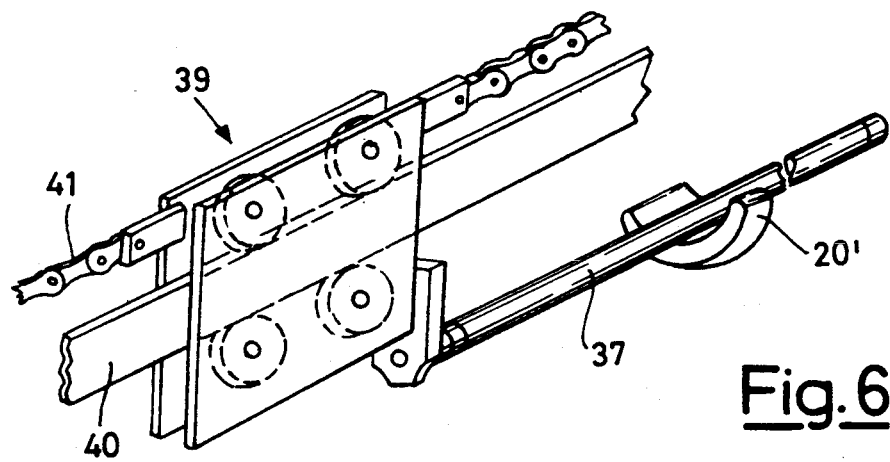
FIG. 6 shows a perspective, schematic and partial view of a fourth part of the device of FIG. 1, and, FIG. 7 shows an enlarged view of a detail of the device of FIG. 1.

For example, in FIG. 6 is shown a possible device for movement for the pusher 37 and the one for the pusher 38 could be equivalent. As seen in said Fig. the end of the pusher opposite the guides is supported by a carriage 39 running along a track 40 parallel to the guides by means of a powered chain 41.

Figure 5:
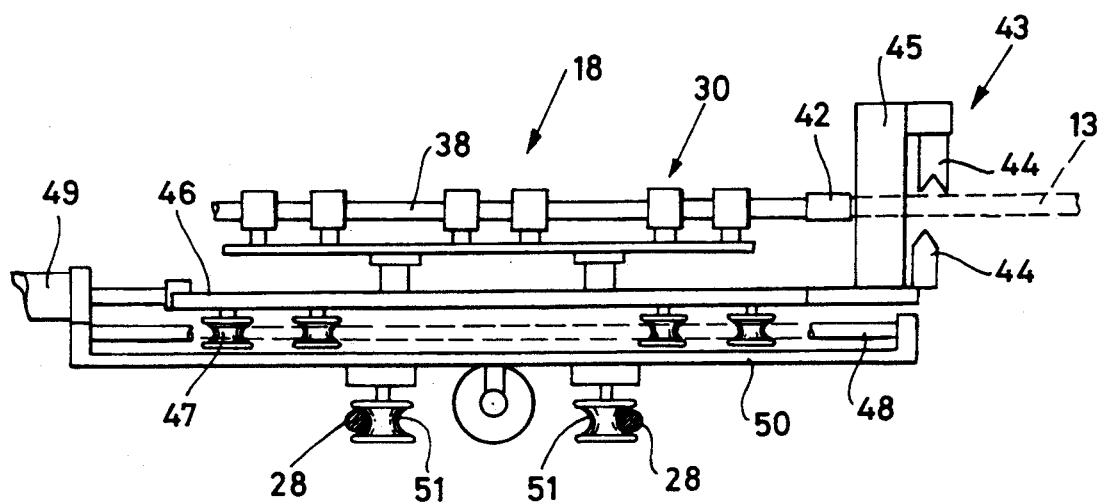
FIG. 5 shows a side view of a third part of the device of FIG. 1.

As seen again in FIG. 1 the pusher 38 has on its pushing end a known elastic pincer engagement element 42 for a tail end of the bar to be fed. Facing the pincer 42 are placed means of insertion add extraction comprising an inserter & extractor device 43 for the bar in said pincer. With reference to FIG. 5 the inserter & extractor 43 comprises a pair of jaws 44 facing each other transversely to the extension of the bar to be gripped and commanded to close by means of an actuator 45, e.g. a compressed air or oil piston, with gear and rack movements. The inserter & extractor is also mobile longitudinally to the bar to draw near or away from the engagement end 42 of the pusher 38. To obtain the longitudinal movement of the inserter & extractor the carriage 18 comprises a first upper plate 46 bearing the inserter & extractor and the guides 20', 30. Said firstplate 46 slides with its own lower rollers 47 along longitudinal tracks 48 by means of a piston 49. The tracks 48 and piston 49 are supported in turn on a second plate 50 below the first and in turn running with its own rollers 51 along the guides 28 by means of the piston 19 to allow the above mentioned transverse alignment movement of the guides 20' or 30 with the guides 20.

During use, operation of the loading device along a feed cycle is as follows.

As described above, when it is necessary to load a new bar in the machine tool 14 the piston 33 is operated so that the blades 22 rise toward their upper operating position while withdrawing the bar waiting against the stops 17. Upon reaching the top of the stops 17 the bar slides along the upper inclined surface of the blades 22 until it stops in position 26 and is then laid on the aligned guides 20, 20' by means of the lowering of the blades toward their lower nonoperating position.

At this point the pusher 37 is operated toward the bar tail to push the bar with its head toward and inside of the spindle 14 of the machine tool. The bar thus begins to rotate, being entrained by the rotation of the machine tool spindle. The guides 20, 20' are mounted as mentioned in a dampened manner and dampen the vibrations caused by the high speed rotation of the bar. As known in the field, the guides 20 can have upper counterguides which close like jaws once the bar 13 has been fed between them. For clarity of the drawings said counter guides are not shown but can be equivalent to the guides and are readily imaginable by a person skilled in the art.

Once the first pusher 37 has reached with its pushing end the position 37' which is slightly greater than the position of the head of the second pusher 38, the first pusher is backed off to its starting position and the piston 19 is operated to align the guides 20, 30 for sliding of the second pusher 38.

The inserter & extractor is then commanded to tighten its jaws on the tail end of the bar 13 as shown in FIG. 7 and the piston 49 is commanded to cause the inserter & extractor 43 to complete a rearward travel toward the head 42 of the pusher. In this manner the bar on the guides is engaged with its tail end in the engagement element 42. The element 42 is supported on the pusher in a freely rotating manner around the axis (in accordance with the known art easily imaginable by a person skilled in art) so that the bar is free to rotate even if engaged therein. Once the jaws 44 have reopened, the bar engaged and supported by the pusher 38 can thus be pushed thereby further inside the machine tool for the desired machining. After completion of the machining cycle the pusher 38 returns to its rest position as shown in FIG. 1, withdrawing from the machine tool the residual bar length still engaged with the element 42. The extractor 43 is commanded to grip the length and the carriage 18 completes its forward travel from the position shown in broken lines to the position shown in solid lines in FIG. 7 so as to withdraw the length from the engagement element 42. The jaws 44 then open and the length falls into a collection area (not shown). The loader is thus ready for a new cycle, withdrawing the next bar from the inclined plane 16 and feeding it to the machine tool.

At this point it is clear that the pre-set purposes of having a reliable and fast loader have been achieved. Naturally the above description of an embodiment applying the innovative principles of the present invention is given merely by way of example and therefore is not to be taken as a limitation of the patent right claimed here. For example, the exact form and proportions of the various parts and the length of the loader and the number of guide elements 20, 20', 30 can vary depending on the peculiar requirements of use and dimensions of the bar to be handled.

I claim:

1. Loading device for loading of bars in a machine tool comprising in combination:
   downwardly inclined chutes for moving a bar downwardly in an inclined plane and against chute stops located adjacent the lower ends of said chutes, and into a withdrawal position on said chutes,
   a plurality of guides for supporting a bar for axial sliding movement, said guides being arranged adjacent said stops and disposed to support a bar for axial insertion into the machine tool,
   raising elements extending between the chutes and the guides and having thereon upper surfaces inclined in part downwardly and terminating with upwardly inclined stop parts, and the raising elements being movable vertically between a first nonoperating position below the chutes and the guides, and a second operating position in which said upper surfaces thereof move above the chute stops and the guides thereby raising the bar placed in the withdrawal position to a height above the chute stops and causing said bar to slide on the downwardly inclined surfaces of said elements toward the guides to a stop position against the stop parts, and upon return of the raising elements into their nonoperating position causing the bar in the stop position to be laid on the underlying guides,
   pushing and gripping means registering coaxially with the bar in said guides and operable to move axially the bar laid thereon along the guides to introduce the bar into the machine tool and subsequently to extract therefrom at least a remnant of the bar from the machine tool along the guides, and
   means for effecting disengagement of the bar remnant from the pushing and gripping means so that the remnant falls to an unloading position.

2. Loading device in accordance with claim 1 characterised in that the pushing and gripping means comprise at least a first pusher terminating at a free head end with an element for engagement of one end opposite to the machine tool of the bar on the guides, the loading device also comprising means of insertion and withdrawal of said free head end in the engagement element for axial movement of the bar respectively toward and away from the engagement element.

3. Loading device in accordance with claim 2 characterised in that the insertion and withdrawal means comprise an insertion & extraction device comprising a pair of jaws facing each other transversely to the extension of the bar on the guides and closed by means of an actuator to grip between them the bar, and the insertion & extraction device being also supported for movement longitudinally with respect to the bar to draw near or away from the engagement element.

4. Loading device in accordance with claim 2 characterised in that the pushing and gripping means comprise at least a second pusher, said first and second pushers being supported for movement transversely for their alternating alignment with the bar on the guides, and the second pusher pushing the bar on the guides for a first section toward the machine tool and the first pusher pushing the bar on the guides for a second section toward the machine tool.

5. Loading device in accordance with claim 1 characterised in that the guides comprise a plurality of elements in the shape of the letter U aligned parallel to the extension of the bar on the guides.

6. Loading device in accordance with claim 5 characterised in that the guide elements are movable transversely with said second pusher to be replaceable by the first pusher upon its alternating alignment with the bar on said guides.

7. Loading device in accordance with claim 1 characterized in that each of the raised stop parts comprises part of an upper surface of a raising element inclined opposite the downwardly inclined part of the upper surface to define therewith substantially a seat for receiving the bar, the upper surface being shaped like the letter V for holding a bar at the stop position.

8. Loading device in accordance with claim 1 characterised in that the raising elements comprise a plurality of raising blades parallel to each other and arranged at intervals in a direction parallel to the axis of the bars located on the raising elements.

9. Loading device in accordance with claim 1 characterised in that the raising elements perform a linear operation with horizontal movement connected to an end of an arm of a bell crank pivoted centrally to a fixed support and with the other end connected in a jointed manner to a support, the raising elements being constrained to move vertically upon operation of the bell crank.

10. Loading device in accordance with claim 9, comprising two bell cranks arranged at the ends of a beam, the beam having near its ends carriages for running along vertical guides.

11. Loading device in accordance with claim 2 characterised in that the engagement element of the first pusher rotates freely relative to the rest of the first pusher.

12. Loading device in accordance with claim 1 characterised in that the pushing and gripping means comprise chain moving means.

* * * * *